United States Patent [19]
Baurle et al.

[11] 3,798,645
[45] Mar. 19, 1974

[54] ANGULAR POSITION DETERMINING SYSTEMS USING TIME SCANNED ARRAYS

[75] Inventors: Herbert F. Baurle; Raymond J. Masak, both of East Northport, N.Y.

[73] Assignee: Hazeltine Corporation, Greenlawn, N.Y.

[22] Filed: Aug. 28, 1970

[21] Appl. No.: 67,821

[52] U.S. Cl. .......... 343/102, 343/16 R, 343/100 SA, 343/108 M
[51] Int. Cl. ............................................. G01s 1/02
[58] Field of Search ... 343/100 SA, 106 D, 113 DE, 343/102, 108 M, 16 R

[56] References Cited
UNITED STATES PATENTS
3,518,669 6/1970 Vogel .............................. 343/16 R
3,234,554 2/1966 Earp et al ....................... 343/108 M

*Primary Examiner*—Benjamin A. Borchelt
*Assistant Examiner*—Richard E. Berger

[57] ABSTRACT

Disclosed are systems for determining the angular position of a target with respect to a reference location. One such system employs a novel array of antenna units at a reference location. The units of the array are coupled together by delay lines so that a pulse supplied to one of the units is in turn sequentially supplied to the remaining units, causing a pulse train to be radiated from the array. A target located in the field of the array is illuminated by a pulse train which has a phase distribution proportional to the angular position of the target with respect to the array and therefore with respect to the reference location. This phase distribution is detected by forming a predetermined electrical signal which can be used to provide an indication of the target's angular position either at the reference location alone, the target alone, or at both the reference location and the target.

19 Claims, 14 Drawing Figures

ANGULAR POSITION DETERMINING SYSTEMS USING TIME SCANNED ARRAYS

CROSS REFERENCE TO RELATED APPLICATIONS

The present invention relates to angular position determining systems such as those described in applicants' simultaneously filed copending U.S. application, Ser. No. 67,820, filed Aug. 28, 1970, entitled "Angular Position Determining System Compensated For Doppler," which is assigned to the same assignee as the present application.

BACKGROUND OF THE INVENTION

This invention relates to novel angular position determining systems utilizing a time scanned array to accurately determine the position of targets located in the field of the array.

Present angular position determining systems generally employ scanning beams formed by variably phased arrays of rotating antennas, to obtain the required positional information. There are several disadvantages inherent in these systems, some of which are the low rate at which angular position for a plurality of targets is obtained, the cost of variable phase shifters in the phased array system, and the unreliability of mechanically scanned antenna systems.

Angular position determining systems have previously been proposed utilizing time scanned arrays. A time scanned array is one in which a predetermined broad radiation pattern is formed in space, instead of the more conventional pencil type scanning beam. The angular position of targets in the field of the time scanned array can be obtained from the nature of the radiation pattern at the position of the target, therefore one advantage of this type of system is that it is capable of providing information for a plurality of targets simultaneously.

The time scanned array systems disclosed in the prior art in general and by C. W. Earp, in particular, have several disadvantages of which it is an object of applicants' invention to overcome.

Firstly, prior art time scanned arrays generally have employed mechanical switches to separately excite the individual units of the array in an appropriate sequence. Such switches are expensive and unreliable as well as being extremely complex when large numbers of antenna units are contained in the array. Furthermore, such switches greatly increase the power requirements of the overall system and preclude use of the array for the purpose of signal reception.

Secondly, prior art systems have generally contemplated a continuous cyclical type of transmission and a receiver which averages the information obtained from such transmissions to provide the desired angular information. This type of operation is therefore not effective in an interlaced or intermittent mode since the receiver is dependent upon continuous transmissions.

Finally, and referring to C. W. Earp's U.S. Pat. No. 3,234,554, in particular, prior art time scanning systems are extremely susceptible to multipath transmissions. This susceptibility is caused by several inadequacies in these systems, two of which are the requirement for a separate reference signal (the ground-reflected signal in the Earp patent) and the failure to incorporate any method for distinguishing the desired information signals, received from the array, from multipath transmissions caused by reflections.

In order to overcome these difficulties a novel time scanned array is disclosed which does not utilize undesirable mechanical switching to excite the units of the array. The system avoids many of the aforementioned prior art multipath problems since no separate reference signal is utilized in obtaining angular information and since in several embodiments a special electrical beam type signal (described hereinafter) is formed in the receiver, one of whose purposes is to enable undesired multipath transmissions to be rejected.

SUMMARY OF THE INVENTION

Objects of the invention therefore are: to provide a novel system capable of determining the angular position of a target with respect to a reference location; to provide such a system capable of providing angular information to either the target, the reference location, or both, to provide such information at a high data rate; and to provide such a system capable of operating in a multipath environment.

Further objects of the invention are: to provide a novel time scanned array antenna useful in such an angular position determining system, to provide such an antenna utilizing fixed delay lines as coupling elements, to provide such an antenna capable of being easily zoomed to a particular sector in space; and to provide such an antenna additionally useful as a reception antenna in an angular position determining system.

Still further objects of the invention are: to provide novel receivers useful in such angular position determining systems, to provide such receivers capable of operating in a multipath environment, and to provide a receiver capable of producing an output indication of the angular position of the target in real time.

In accordance with the invention, there is provided a system for determining the angular position of a target with respect to a reference location, which comprises an array of antenna units at the reference location; means for supplying a pulse type signal to a unit of the array; delay means for coupling the pulse type signal to each of the remaining units of the array in a predetermined sequence and having a predetermined phase relationship such that each unit radiates a corresponding pulse type signal during a time interval unique to that unit, whereby a target located in the field of the array is illuminated by a train of radiated pulses having a phase distribution which is proportional to the angular position of the target in relation to the array and means for receiving the train of radiated pulses which have illuminated the target.

The system further includes means for detecting the phase distribution of the received pulse train, by forming an electrical signal having a waveshape substantially equivalent to the field intensity characteristic which would be formed at the target by a predetermined scanning beam illuminating the target, and for providing an output indication of the angular position of the target with respect to the array and therefore with respect to the reference location.

DESCRIPTION AND OPERATION OF THE EMBODIMENTS OF FIGS. 1 AND 6

Figure 1:
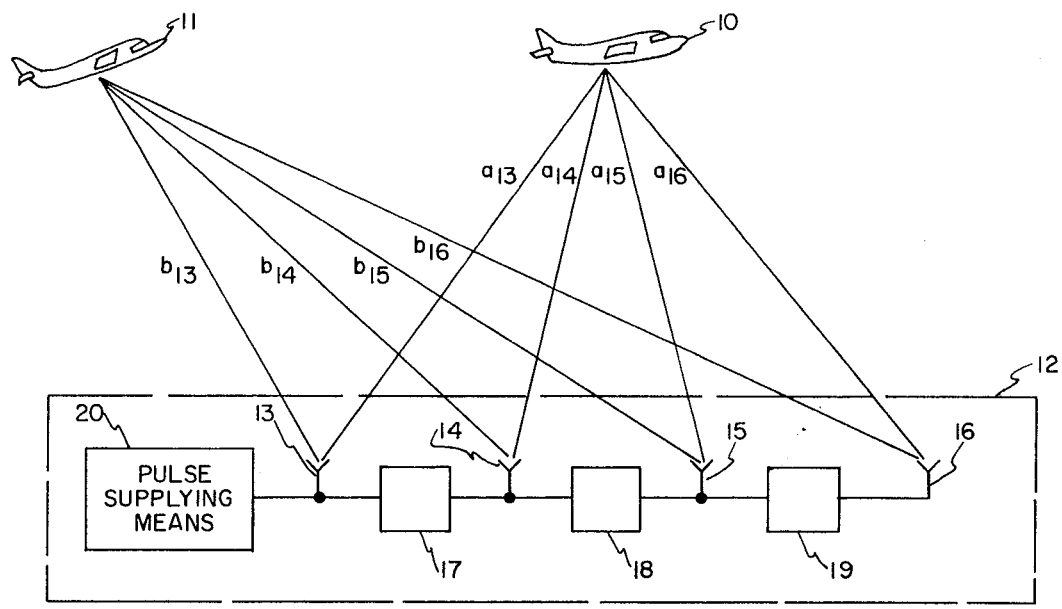
FIG. 1 is an illustration of an embodiment of the invention incorporating a time scanned array antenna.

Referring to FIG. 1 there is shown an embodiment of applicants' invention used as an aircraft landing system in which targets such as aircraft 10 and 11 are illuminated by the radiations from the array antenna within dotted box 12 which for purposes of this embodiment defines a reference location. It will be recognized that applicants' invention is not limited to landing systems but is useful wherever the angular position of a plurality of targets (for example aircraft, boats, automobiles, etc.) is to be determined. Furthermore, reference location 12 need not be stationary as shown in the illustration but may for example be contained in an aircraft in which case a ground station may be used as a target.

Contained within reference location 12 is an array antenna consisting of antenna units 13, 14, 15 and 16 coupled together by delay lines 17, 18 and 19. These units may be any conventional radiating antenna elements such as dipoles or horns, and may consist of more than one element as will be explained hereinafter. Also included in the reference location is means 20 for supplying a pulse type signal to a unit 13 of the array. This means may be a conventional pulse transmitter or other pulse generation circuit and may supply either a single pulse or a group of pulses. Means 20 need not be included in the reference location but may be remote from it and the extent of the reference location in general may be expanded or contracted to take into account any area in which the array is located and with respect to which angular position information is desired.

The array shown contains four units 13, 14, 15 and 16 by way of example only which units are shown for purposes of clarity to be larger with respect to the distance to the targets than would be practical in actual systems. Furthermore, practical systems would employ arrays having larger numbers of units, resulting in larger pulse trains, to obtain more accurate angular position determination from the phase distribution of these pulse trains.

Figure 2:
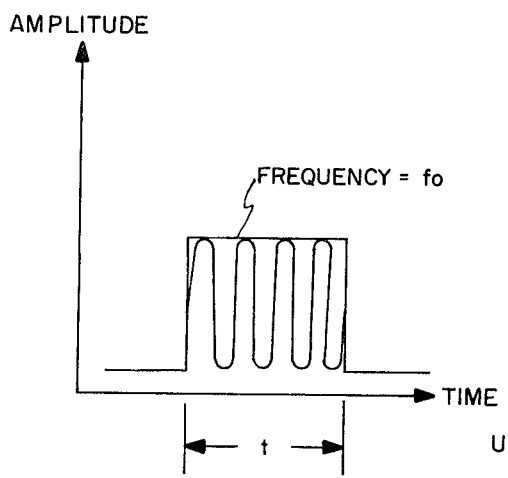
FIGS. 2, 3, 4a, 4b and 5 are graphical illustrations of pulse type signals useful in understanding the embodiments of FIG. 1.
Figure 3:
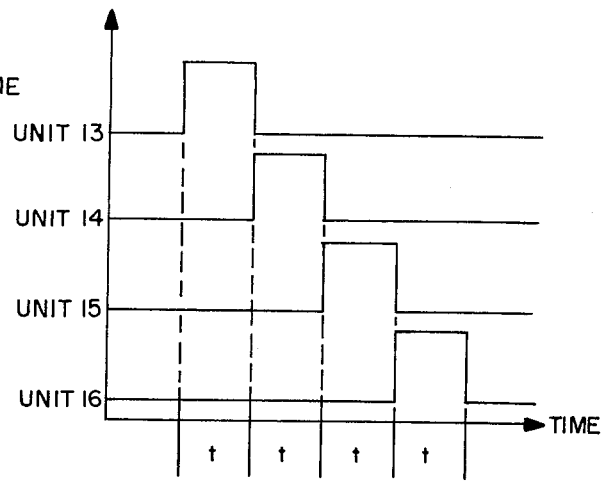

Referring now to FIG. 2, there is shown a typical pulse type signal supplied to unit 13 by means 20 which consists of a single pulse of carrier signal at a carrier frequency $f_o$ and having a predetermined duration $t$. Delay lines 17, 18 and 19, which comprise delay means for coupling the supplied pulse type signal to each of the remaining units of the array in a predetermined sequence and with a predetermined phase relationship such that each unit radiates a corresponding pulse type signal during a time interval unique to that unit, are selected to have fixed predetermined delays which are equal to the duration $t$ of the pulse of FIG. 1. It will be recognized that the fixed individual delay lines of FIG. 1 could be replaced by a single multitap delay line which would supply each unit of the array with the pulse of FIG. 2 in the manner described above. In this manner each unit of the array radiates a corresponding pulse during a unique time interval as shown in FIG. 3, which illustrates the time of arrival at each of the units of the array 13, 14, 15 and 16 of the envelope of the pulse supplied to unit 13.

Targets such as aircraft in the field of the array are illuminated by a radiated pulse train (one pulse from each unit) rather than the single pulse of FIG. 2 although the extent of the field of the array is determined by the radiation pattern of a single unit radiating alone, since each unit radiates independently of the other units and there is no contribution or interference from the radiation of other units in the array as is the case with conventional scanning beam arrays.

Figure 4A:
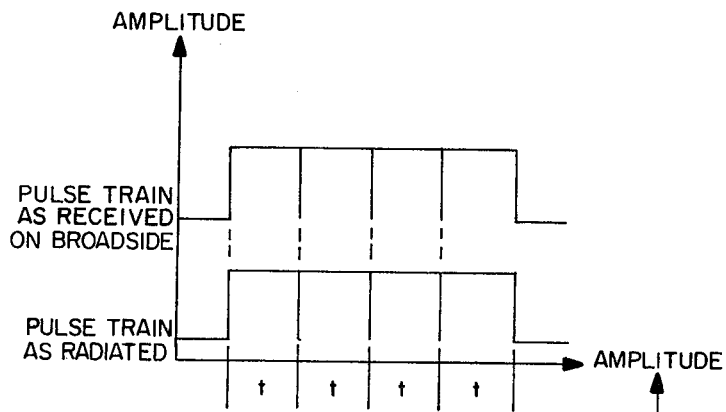

The angular position of targets in the field of this array can be determined from the phase distribution of the pulse train (i.e., progressive phase shift between pulses) sensed at each target because targets at different positions in space will sense different phase distributions. The reason for this is clearly seen by referring back to FIG. 1 and looking at lines $a_{13}$, $a_{14}$, $a_{15}$, $a_{16}$ and $b_{13}$, $b_{14}$, $b_{15}$ and $b_{16}$ drawn between correspondingly numbered units of the array and aircraft 10 and 11. These lines represent the distance traveled by the pulse radiated from each unit of the array to the targets 10 and 11. Since aircraft 10 is assumed to be on the broadside axis of the array (axis perpendicular to the plane of the array) the $a$ lines are approximately the same length indicating that it takes the same amount of time for the pulse from unit 13 (line $a_{13}$) to reach the target as it does for the pulse from unit 16 (line $a_{16}$). Therefore aircraft 10 will sense the pulse train substantially as it was transmitted or in other words having the same phase distribution as that introduced by delay lines 17, 18 and 19. FIG. 4a shows a graph of the envelopes of the pulses as radiated from each element of the array and the pulse train sensed by an aircraft such as 10, which is on the broadside axis of the array. Note that there is substantially no phase shift between pulses of the pulse train illustrated since it is assumed that no phase shift was introduced by delay lines 17, 18 and 19.

Figure 4B:
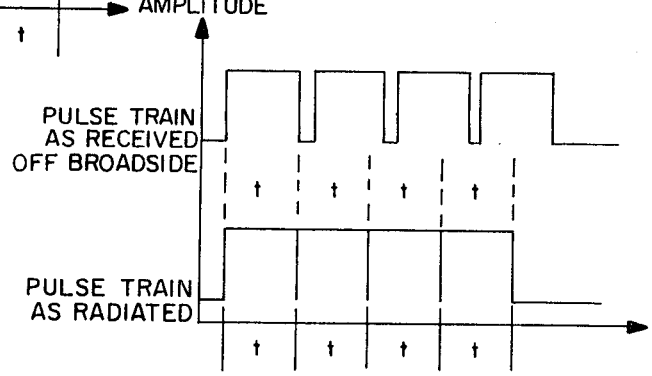

On the other hand looking at lines $b$ drawn to aircraft 11, it can be seen that the distance (line $b_{13}$) between the aircraft and unit 13 is less than the distance between the aircraft and unit 14 (line $b_{14}$) and likewise for units 15 and 16. This means that it takes longer for the pulse from unit 16 to arrive at aircraft 11 than it does for the pulse from unit 15 and so on for units 14 and 13. This introduces a phase shift between the pulses of the pulse train, as sensed at the aircraft 11, which causes the phase distribution of the pulse train to differ from that sensed by the aircraft 10 on the boresight axis of the array. This change in phase distribution is proportional to the difference in path length between units of the array and the aircraft 11, which in turn is proportional to the angular position of the aircraft with respect to the array (by conventional trigonometry). Therefore, the angular position of the aircraft can be determined by measuring this phase distribution with novel receiving apparatus herein described. FIG. 4b shows the relationship between the pulse train transmitted from the array and the pulse train sensed by aircraft 11 and shows the small phase shift between pulses of the pulse train sensed at the target caused by the angular position of the target.

In the embodiment illustrated the phase shift between pulses radiated by the array and therefore the phase shift between pulses on the broadside axis of the array is assumed to be zero. If desired an original phase shift between pulses can be introduced before radiation by the array, thereby establishing a new reference phase distribution on the broadside axis of the array with respect to which the angular position of targets not located on the broadside axis can be measured.

The overall pulse train sensed by aircraft 11 will not only have a phase distribution which differs from the reference phase distribution sensed by aircraft 10 on the broadside axis, but will also have a carrier frequency which correspondingly differs from that sensed by target 10. Several embodiments of the receiving apparatus disclosed herein are adapted to detect this change in carrier frequency and to provide an output indication of the targets' angular position based on it.

The embodiment of FIG. 1 shows a linear array by way of example only, and if desired other array forms can be assembled to provide coverage over larger sectors of space in a manner well known in the art. Furthermore, both azimuth angle and elevation angle information can be obtained by suitable positioning of a pair of array antennas and operating them in an interlaced mode. For example a first linear array positioned horizontally with respect to the ground could be utilized to obtain azimuth angle information and a second linear array positioned vertically with respect to the ground could be utilized to obtain elevation angle information for targets such as aircraft located in the field of these arrays.

The use of delay lines 17, 18 and 19 for coupling a pulse type signal to each unit of the array of FIG. 1 provides several distinct advantages over prior art systems, one of which is made apparent by assuming that means 20 supplies not a single pulse, as in FIG. 2, but a pair of like pulses having a spacing (i.e. between leading edges of the pulses) selected to be equal to the width $t$ of the pulse, and therefore equal to the delay of delay lines 17, 18 and 19. In the embodiment of FIG. 1, when a single pulse is supplied to the array, the field of the array is determined by the radiation pattern of a single unit radiating alone. However, when a pair of pulses are supplied to the array, at the time when the first pulse excites unit 14, the second pulse will excite unit 13 and the corresponding radiation pattern from each unit will combine to restrict somewhat the field of the array. As a result, when all the units of the array are excited in this manner (i.e. sequentially in pairs) the field of array is restricted, or " zoomed", to approximately one-half of its original field.

Figure 5:
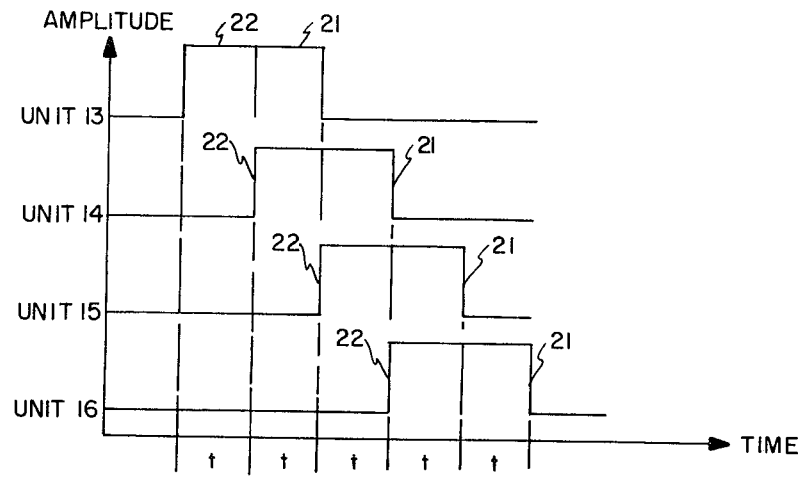

FIG. 5 is a graphical illustration showing the time of arrival of the envelopes of a pair of pulses 21 and 22 supplied by means 20 to the radiating units of the array of FIG. 1. The illustration clearly shows the overlap between pulse 21 and pulse 22 as they arrive at different units of the array. This overlap results in the aforementioned restriction of the field of array and thereby achieves a course zooming of the array to a narrower sector in space, simply and inexpensively, without changing the physical position of the array or its angular position determining characteristics.

Figure 6:
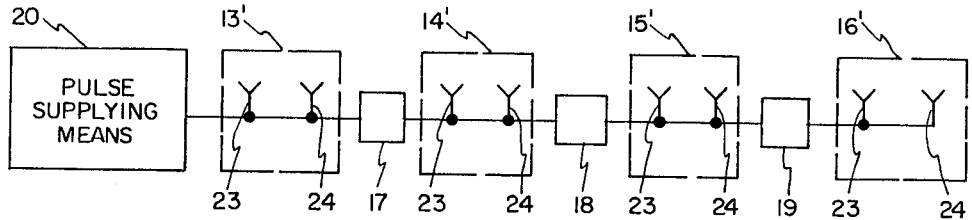
FIG. 6 is an alternate embodiment of an array antenna constructed in accordance with the teachings of the invention.

An alternate method of obtaining the same result (array field restriction) would be to construct an array such as that shown in the embodiment of FIG. 6 which comprises antenna units 13', 14', 15' and 16' connected together with delay lines 17, 18 and 19 as in the array of FIG. 1, but in this case each antenna unit consists of two radiating elements 23 and 24 spaced at a suitable antenna unit spacing (preferably one-half wavelength). Only one pulse need be supplied to unit 13' of the array by means 20 since the overlapping radiation patterns will result from the simultaneously excited elements 23 and 24, in each unit producing the same restriction in the field of the array as described above. If greater restrictions in the field of the array, for example, of one-third, one-fourth or more, is desired, it can be accomplished by supplying a third, fourth or more pulses in the embodiment of FIG. 1 or by including a third, fourth or more elements in the embodiment of FIG. 6, or by combining the two embodiments and supplying two or more pulses to the array in the embodiment of FIG. 6.

DESCRIPTION AND OPERATION OF THE SYSTEM OF FIG. 7

Figure 7:
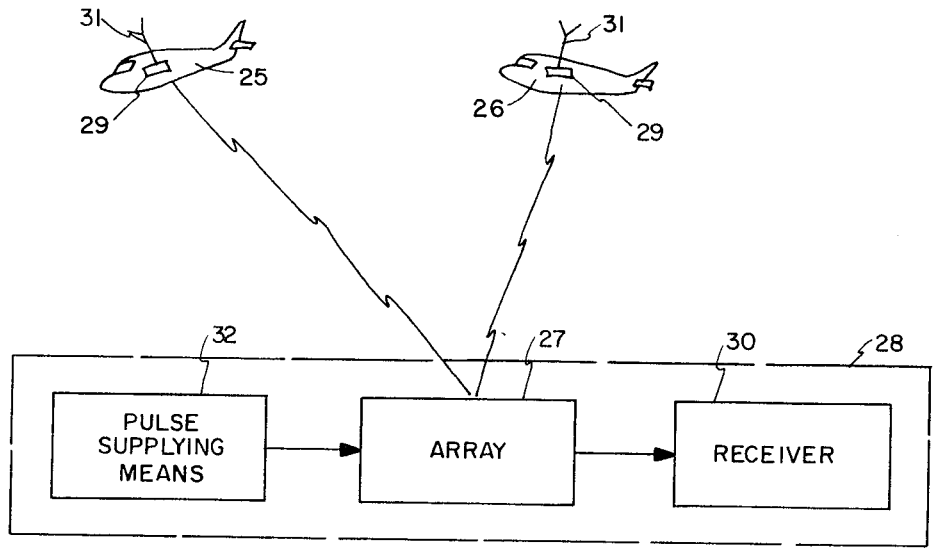
FIG. 7 is an embodiment of the invention illustrated as an aircraft landing system.

Since the overall radiation pattern transmitted from the array of FIG. 1, for example, is a broad one, a plurality of targets in the field of the array can obtain the desired angular position information simultaneously. Referring now to FIG. 7 which shows two such targets 25 and 26 in the field of an array 27, assumed to be similar to, that of FIG. 1, located at a reference location 28. Both targets include a novel receiving apparatus 29, described hereinafter, so that upon entering the field of the array they can obtain an indication of their angular position with respect to the reference location. In the embodiment of FIG. 7 the reference location also includes a novel receiving apparatus 30 in order to provide at the reference location an indication of the angular position of the aircraft. For this information to be obtained, the pulse train radiated by the array is either reflected or received and retransmitted by the aircraft to the reference location, but in either case the phase distribution sensed by the aircraft is preserved so that it can be measured in receiving apparatus 30.

A further advantage of including a receiving apparatus at the reference location is that both range and angular information for an aircraft can be obtained from each transmission of a pulse train by the array since the range is represented by the round trip travel time of the pulse train from the array to the target and back to the receiving apparatus, and the angular information is contained in the phase distribution of the received pulse train.

Figure 8:
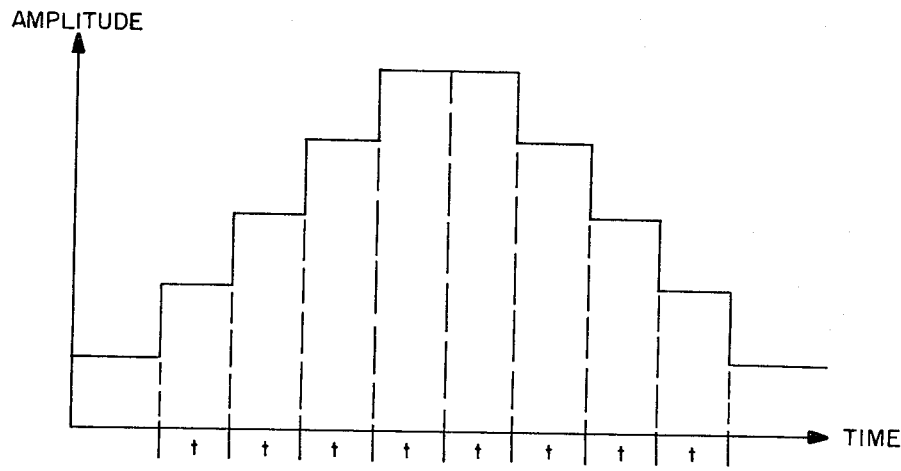
FIG. 8 is a graphical illustration useful in understanding the embodiment of FIG. 7.

While receiving apparatus 29 in the aircraft 25 and 26 both include conventional omnidirectional antennas 31 for receiving the pulse train from the array, the receiving apparatus 30 located at the reference location 28 is shown as connected to the original array 27. This feature is particularly advantageous since the use of delay lines in the array insures that there will be antenna gain. The received pulse train which arrives at each unit of the array is combined through the delay lines of the array to provide at the input of the receiver 30 a pulse train having a staircase amplitude function similar to that shown in FIG. 8 (which shows the envelope of such pulse train for a target on the broadside axis). While this envelope alone could be used to provide an indication of angular position (by detecting its slope) the receiving apparatus 30 described herein are adapted to detect the phase distribution of the pulses of the carrier frequency under the envelope (not shown), as this is a more accurate form of detection and therefore more useful in angular position determining systems such as aircraft landing systems where accuracy is required.

Another particularly useful characteristic of the system of FIG. 7 is the ability to transmit and receive selected other information, for example IFF, by additionally coding the pulse supplied by pulse generator 20 to be representative of this other information. The coding can be of any suitable kind well known in the art, for example linear FM phase coding. This coding can be adapted so as not to disturb the angular position determination since in that case what is measured is the phase distribution of the overall pulse train and not the phase characteristics of individual pulses. Receiving apparatus used in such a system may incorporate any conventional decoding scheme suitable for the type of coding utilized, thereby providing additional information to the aircraft or the reference location for a single pulse train transmission.

DESCRIPTION AND OPERATION OF THE EMBODIMENT OF FIG. 9

Figure 9:
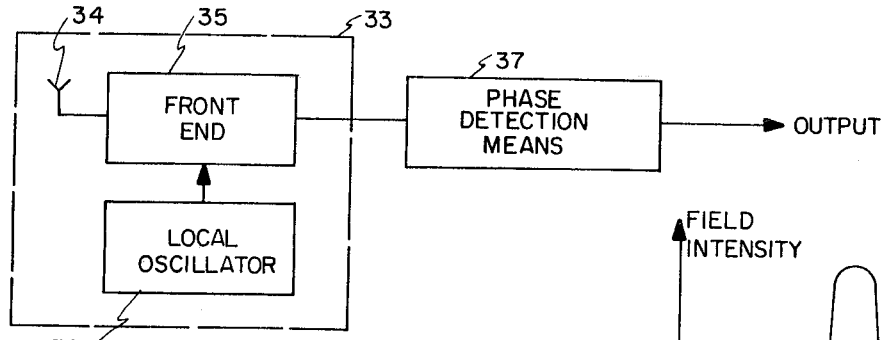
FIG. 9 is a novel receiving apparatus useful in the system of FIG. 7.

Turning now to a novel receiving apparatus useful in a system for determining the angular position of targets with respect to the reference location, FIG. 9 shows a block diagram of an embodiment built in accordance with one aspect of the invention.

Shown in dotted box 33 of FIG. 9 are means for receiving the train of radiated pulses which have illuminated the target. This means is shown as a conventional omnidirectional antenna 34 in combination with the receiver front end 35 and a local oscillator 36, which combination provides a pulse train at the input to a phase detection means 37. Shown as block 37 is means for detecting the phase distribution of the received pulse train, and for providing an output indication of the angular position of the target with respect to the array.

Figure 10:
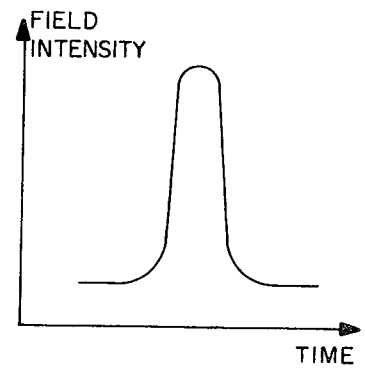
FIG. 10 is a graphical illustration useful in understanding the embodiment of FIG. 9, and FIGS. 11, 12 and 13 are alternate phase detection means useful in the embodiment of FIG. 9.

In certain prior art angular position determining systems a pencil type scanning beam scans through a sector of space illuminating a target for a short instant of time and then proceeding on through the sector. At the target a plot of field intensity vs. time would be similar to that shown in FIG. 10 as the pencil beam sweeps across the target. As previously stated one of the advantages of the present invention is that no such variation in field intensity is produced since all targets in the field of the array are illuminated at substantially the same time by the broad radiation pattern of the array. However, in accordance with the present invention resolution capability identical to that of the scanning beam system can be obtained by forming in the receiver an electrial signal whose waveshape is the equivalent of the field intensity characteristic (an example of which is shown in FIG. 10) which would have been formed at a target by a scanning beam illuminating the target. This electrical signal (herein called "beam type signal") once formed in the receiver helps discriminate against multipath transmissions since the particular field intensity plot of FIG. 10 and therefore its equivalent electrical signal can be easily identified in the receiver and locked in during target tracking, thereby preventing multipath transmissions from interfering. In addition, formation of this signal allows the receiver herein described to determine the angular position of targets from a single transmission of the aforementioned pulse train, thereby permitting the entire system to operate in intermittent modes.

Figure 11:
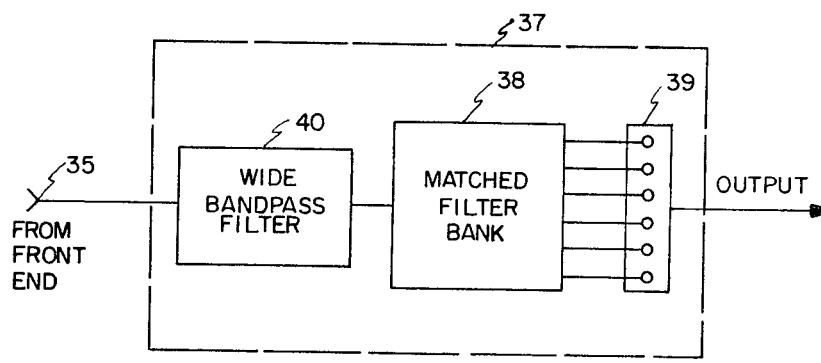
Figure 12:
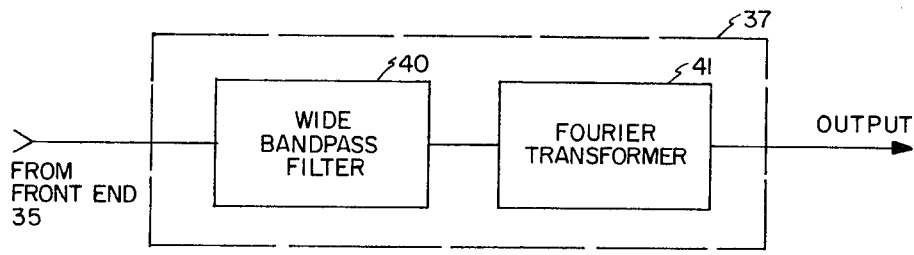
Figure 13:
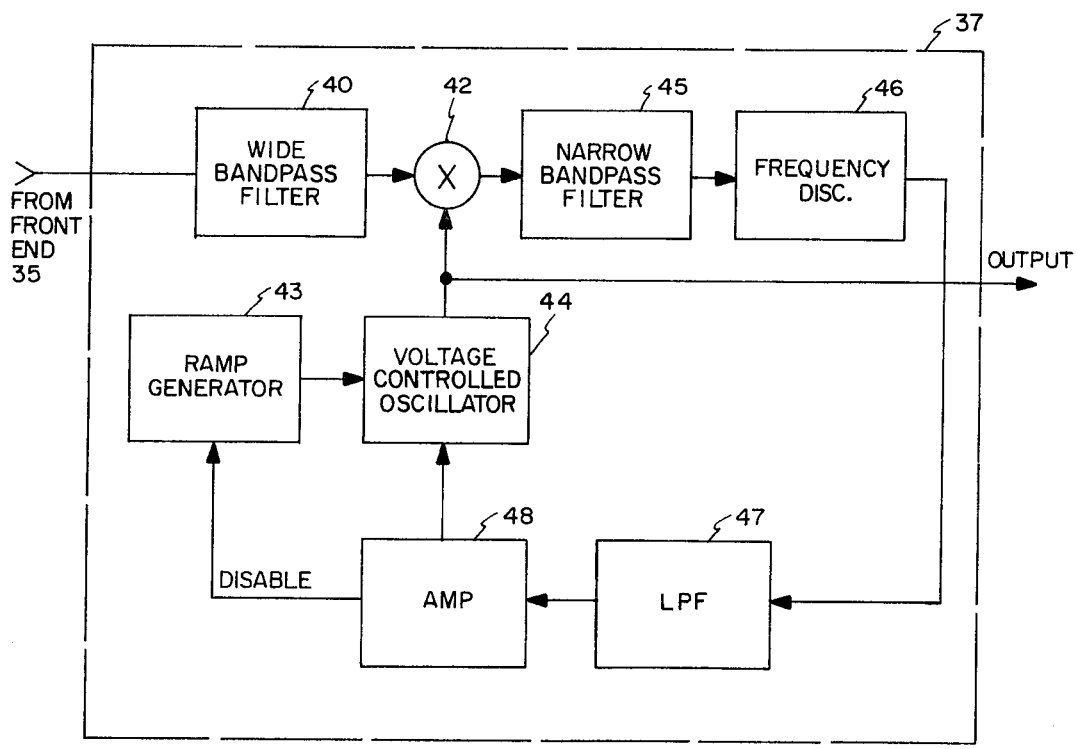

The different embodiments of phase detection means 37 incorporating this technique (beam type signal forming) are shown in FIGS. 11, 12 and 13. The receivers disclosed do not incorporate an undesirable reference signal as do the prior art systems since all phase distribution measurements takes place directly on the received pulse train. Prior art systems use the reference signal as a frequency standard for comparison purposes in angular position determination and therefore are subject to the inherent multipath problems caused by this reference signal.

Referring to FIG. 11, one embodiment of phase detection means 37 is shown as comprising a plurality (i.e. bank) of matched filters 38 which may, for example, consist of a multitap delay line and a phase matrix. The received pulse train is fed to the filters 38 from front end 35 through wide bandpass filter 40 which is centered approximately about the carrier frequency to eliminate extraneous noise. Since each matched filter is adapted to add the pulses of the pulse train and produce an output signal for a pulse train having a particular phase distribution, only the filter matched to the phase distribution sensed by the target will provide an output signal on the corresponding one of the terminals 39. Since this output signal is formed in much the same way that a phased array antenna forms a scanning beam in space, (pulses combined according to their phase to produce a maximum contribution), the output signal will appear on an appropriate one of the terminals 39 as the aforementioned beam type signal. This signal (output indication) represents the angular position of the target with respect to the array with different angular positions represented by different phase distributions providing an output signal on different ones of the terminals 39.

Referring now to FIG. 12 a second embodiment of phase detection means 37 is shown which employs a wide bandpass filter 40 centered approximately about the carrier frequency to eliminate extraneous noise. Further included is a Fourier transformer 41 which, as is well known to the art, has the ability to accept an input signal and to provide an output indication in real time which represents the mathematical Fourier transform of the input signal. In effect the Fourier transformer performs a spectrum analysis on the input signal and therefore the output indication, which in this case is a pulse in real time, is representative of the frequency of the overall received pulse train which in turn is representative of the angular position of the target as described previously. Since the output indication is provided in real time it is more easily utilized for display purposes than was the previous indication.

A third embodiment of phase detection means 37 useful in a receiver built in accordance with the invention is shown in FIG. 13. This embodiment provides several advantages over the previous ones in that the entire detection process takes place in the frequency domain, thereby providing relatively accurate position determination over a continuous period of time. Phase detection means 37 in FIG. 13 is shown as comprising a wide bandpass filter 40 centered approximately about the carrier frequency which as in previous cases, accepts the pulse train from front end 35 and filters out extraneous noise. Further included is a mixer 42 which is supplied with a signal from voltage controlled oscillator 44 as well as the pulse train from bandpass filter 40. Prior to receiving any pulse trains a ramp generator 43 supplies a ramp signal to the voltage controlled oscillator in order to cause the frequency of the oscillator to vary from zero to a frequency equal to the bandwidth of bandpass filter 40. This is done in order to match the frequency of any possible received pulse trains to the characteristic defined by narrow bandpass filter 45 since the pulse train supplied from bandpass filter 40 may not be centered about the same frequency as narrow bandpass filter 45. The frequency vs. amplitude characteristic of bandpass filter 45 is matched to the waveshape of the signal which would be created if the pulses of a received pulse train were combined to form the aforementioned beam type signal. Therefore if received signals do not combine in filter 45 to match the characteristic of the filter they are rejected and no output indication is provided. Upon reception of a proper signal (i.e. a pulse train that matches the characteristic of filter 45) frequency discriminator 46 in combination with low pass filter 47 generates a control voltage which is representative of the center frequency of the received signal. This control voltage is applied through amplifier 48 to the control input of oscillator 44 and to ramp generator 43, disabling the ramp generator. In effect this locks the received signal into the characteristic of bandpass filter 45, since should the target change in angle, causing a change in frequency of the received pulse train, the change would be sensed by discriminator 46 and the frequency of oscillation of oscillator 44 would be changed through the feedback loop to compensate for the change in target angle. An output indication which is representative of the targets' angular position can be taken from the output of oscillator 44, since the signal frequency at this point necessarily varies with changes in frequency of the received pulse trains, which changes represent changes in phase distribution and therefore changes in angular position. It should be noted that once bandpass filter 45 receives a signal which is matched to this characteristic and the remainder of the feedback loop locks in, no multipath signals can interfere with the tracking process generated in the loop.

This type of frequency discrimination is particularly advantageous in combination with a time scanned array system, since once a target is present in the field of the array it receives continuous angular position information, substantially immune from multipath interference due to reflection of the original transmission.

While there have been described what are at present considered to be the preferred embodiments of this invention, it will be obvious to those skilled in the art that various changes and modifications may be made therein without departing from the invention.

What is claimed is:

1. System for determining the angular position of a target with respect to a reference location, comprising:

an array of antenna units at said reference location;

means for supplying a pulse type signal to a unit of said array;

delay means for coupling said pulse type signal to each of the remaining units of said array in a predetermined sequence and having a predetermined phase relationship such that each unit radiates a corresponding pulse type signal during a time interval unique to that unit, whereby a target located in the field of said array is illuminated by a train of radiated pulses having a phase distribution which is proportional to the angular position of said target in relation to said array;

means for receiving the train of radiated pulses which have illuminated said target;

and means for detecting the phase distribution of said received pulse train, by forming an electrical signal having a waveshape substantially equivalent to the field intensity characteristic which would be formed at said target by a predetermined scanning beam illuminating said target, and for providing an output indication of the angular position of said target with respect to said array and therefore with respect to said reference location.

2. A system in accordance with claim 1, wherein said receiving and detecting means are at said reference location and wherein said target includes means for receiving and retransmitting said radiated pulse train to said reference location, thereby providing said output indication at said reference location.

3. A system in accordance with claim 1, wherein said receiving and detecting means are at said reference location and wherein said radiated pulse train is reflected by said target to said reference location, thereby providing said output indication at said reference location.

4. A system in accordance with claim 1, wherein said detecting means comprises a plurality of matched filters each matched to the phase distribution due to a selected angular position thereby providing said electrical signal from the particular filter matched to the phase distribution which corresponds to the angular position of said target with respect to said reference location.

5. A system in accordance with claim 1, wherein said receiving means and said detecting means are at said target thereby providing said target with an indication of its angular position with respect to said reference location.

6. A system in accordance with claim 4, additionally capable of transmitting and receiving selected other information;

wherein said pulse type signal supplying means comprises means for supplying a pulse type signal coded to represent said other information;

and wherein there is additionally included at said target means for decoding said received pulses and for providing a second output indication representative of said other information.

7. System for determining the angular position of a target with respect to a reference location, comprising:

an array of antenna units at said reference location;

means for supplying a pulse type signal to a unit of said array;

delay means for coupling said pulse type signal to each of the remaining units of said array in a predetermined sequence and having a predetermined phase relationship such that each unit radiates a corresponding pulse type signal during a time interval unique to that unit, whereby a target located in the field of said array is illuminated by a train of radiated pulses having a phase distribution which is proportional to the angular position of said target in relation to said array;

means for receiving the train of radiated pulses which have illuminated said target;

and a Fourier transformer for detecting the phase distribution of said received pulse train, by forming an electrical signal having a waveshape substantially equivalent to the field intensity characteristic which would be formed at said target by a predetermined scanning beam illuminating said target, and for providing an output indication in real time which is representative of the angular position of said target with respect to said array and therefore with respect to said reference location.

8. A landing system for determining the angular position of an aircraft with respect to a reference location, comprising:

an array of antenna units at said reference location;

means for supplying a pulse type signal to a unit of said array;

delay means for coupling said pulse type signal to each of the remaining units of said array in a predetermined sequence and having a predetermined phase relationship such that each unit radiates a corresponding pulse type signal during a time interval unique to that unit, whereby an aircraft located in the field of said array is illuminated by a train of radiated pulses having a phase distribution which is proportional to the angular position of said target in relation to said array;

means for receiving the train of radiated pulses which have illuminated said aircraft;

and means including a frequency lock loop for combining the pulses of said received pulse train to form an electrical signal having a waveshape substantially equivalent to the field intensity characteristic which would be formed at said aircraft by a predetermined scanning beam illuminating said aircraft, the center frequency of said electrical signal being representative of the angular position of said aircraft with respect to said array and therefore with respect to said reference location.

9. Apparatus usable in a system for determining the angular position of a target with respect to a reference location comprising:

an array of antenna units at said reference location;

means for supplying a pulse type signal to a unit of said array;

and delay means for coupling said pulse type signal to each of the remaining units of said array in a predetermined sequence and having a predetermined phase relationship such that each unit radiates a corresponding pulse type signal during a time interval unique to that unit and such that all units of said array do not radiate simultaneously, whereby a target located in the field of said array is illuminated by a train of radiated pulses having a phase distribution which is proportional to the angular position of said target in relation to said array.

10. Apparatus in accordance with claim 9, wherein each unit of said array comprises a single antenna element and wherein said supplied pulse type signal comprises a single predetermined pulse thereby producing from said array a series of radiation patterns each corresponding to the radiation pattern produced by a single antenna element.

11. Apparatus in accordance with claim 9, wherein each unit of said array comprises a single antenna element and wherein said supplied pulse type signal comprises a plurality of pulses having a predetermined width and spacing thereby producing from said array a series of radiation patterns each corresponding to the radiation pattern produced when a number of said antenna elements, equal to the number of pulses supplied, simultaneously radiate a single pulse.

12. Apparatus in accordance with claim 9, wherein each antenna unit comprises a plurality of antenna elements thereby providing from said array a series of radiation patterns each corresponding to the radiation pattern produced by a number of said antenna units, equal to the number of pulses supplied in said pulse type signal, simultaneously radiating a single pulse.

13. Apparatus in accordance with claim 9, wherein said array is a linear array and wherein said delay means comprises fixed delay lines connected between units of said array.

14. Apparatus in accordance with claim 9, additionally capable of transmitting selected other information wherein said pulse supplying means comprises means for supplying a pulse type signal coded to represent said other information.

15. Apparatus usable in a system for determining the angular position of a target with respect to a reference location, wherein said target is illuminated by a train of radiated pulses having a phase distribution which is proportional to the angular position of said target with respect to said reference location comprising:

means for receiving the train of radiated pulses which have illuminated said target;

and means for detecting the phase distribution of said received pulse train, by forming an electrical signal having a waveshape substantially equivalent to the field intensity characteristic which would be formed at said target by a predetermined scanning beam illuminating said target, and for providing an output indication of the angular position of said target with respect to said array and therefore with respect to said reference location.

16. Apparatus in accordance with claim 15, wherein said receiving means comprises:

an array of antenna units;

and delay means for coupling said units together in a predetermined sequence such that said pulses, when received by said antenna units, are assembled into a train of pulses having a staircase function waveform, said staircase function pulse train being representative of said phase distribution.

17. Apparatus in accordance with claim 15, wherein said detecting means comprises a plurality of matched filters each matched to the phase distribution due to a selected angular position thereby providing said electrical signal from the particular filter matched to the phase distribution which corresponds to the angular position of said target with respect to said reference location.

18. Apparatus in accordance with claim 15, wherein said detecting means comprises a Fourier transformer for developing said electrical signal and for providing said output indication in real time.

19. Apparatus usable in a system for determining the angular position of a target with respect to a reference location, wherein said target is illuminated by a train of radiated pulses having a phase distribution which is proportional to the angular position of said target with respect to said reference location comprising:

means for receiving the train of radiated pulses which have illuminated said target;

and means, including a frequency locked loop, for combining the pulses of said received pulse train to form an electrical signal having a waveshape substantially equivalent to the field intensity characteristic which would have been formed at said target by a predetermined scanning beam illuminating said target, the center frequency of said electrical signal being representative of the angular position of said target with respect to said array and therefore with respect to said reference location.

* * * * *